(12) United States Patent
Xu et al.

(10) Patent No.: US 11,065,637 B2
(45) Date of Patent: Jul. 20, 2021

(54) SPRAYING TOOLING OF MOTOR VEHICLE WHEEL HUB

(71) Applicant: CITIC Dicastal CO., LTD., Hebei (CN)

(72) Inventors: Zuo Xu, Qinhuangdao (CN); Guoyuan Xiong, Qinhuangdao (CN); Yudong He, Qinhuangdao (CN); Libo Liu, Qinhuangdao (CN)

(73) Assignee: CITIC DICASTAL CO., LTD, Qinhuangdao (CN)

( * ) Notice: Subject to any disclaimer, the term of this patent is extended or adjusted under 35 U.S.C. 154(b) by 0 days.

(21) Appl. No.: 16/568,873

(22) Filed: Sep. 12, 2019

(65) Prior Publication Data
US 2020/0398298 A1 Dec. 24, 2020

(30) Foreign Application Priority Data
Jun. 19, 2019 (CN) .......................... 201910531331.0

(51) Int. Cl.
| | |
|---|---|
| *B05B 13/02* | (2006.01) |
| *B05C 13/02* | (2006.01) |
| *B21H 1/10* | (2006.01) |
| *B65G 43/08* | (2006.01) |
| *B65G 47/244* | (2006.01) |

(52) U.S. Cl.
CPC ...... *B05B 13/0235* (2013.01); *B05B 13/0228* (2013.01); *B05B 13/0285* (2013.01); *B05C 13/02* (2013.01); *B21H 1/10* (2013.01); *B65G 43/08* (2013.01); *B65G 47/244* (2013.01); *B05B 13/0242* (2013.01)

(58) Field of Classification Search
CPC .......................... B05B 13/0235; B65G 47/244
See application file for complete search history.

(56) References Cited

U.S. PATENT DOCUMENTS

| | | | | |
|---|---|---|---|---|
| 3,962,987 | A * | 6/1976 | Brandl ................ | B29C 37/0071 118/44 |
| 4,430,958 | A * | 2/1984 | Boggs ................. | B05B 13/0242 118/318 |
| 4,483,434 | A * | 11/1984 | Miwa ................... | B65G 47/244 198/394 |
| 5,209,181 | A * | 5/1993 | Flood .................. | B05B 13/0235 118/322 |
| 5,989,644 | A * | 11/1999 | Williams ............ | B05B 13/0235 118/321 |
| 6,491,755 | B1 * | 12/2002 | Meinke ............... | B05B 13/0228 118/320 |

\* cited by examiner

*Primary Examiner* — Binu Thomas
(74) *Attorney, Agent, or Firm* — Cooper Legal Group, LLC

(57) ABSTRACT

A spraying tooling of a motor vehicle wheel hub is provided. The spraying tooling includes an assembly line, multiple wheel hub bases each capable of moving on the assembly line, multiple driving mechanisms each capable of driving a wheel hub base to rotate at a preset position on the assembly line, multiple triggering components each capable of triggering a driving mechanism to operate, multiple maintaining components each capable of maintaining a preset time for a triggering component, and a control component; the wheel hub base includes a sliding seat capable of moving on the assembly line and a tray capable of rotating along with rotation of the driving mechanism, and the tray is rotatably mounted on the sliding seat; and all of the driving mechanisms and the triggering components are electrically connected to the control component.

6 Claims, 4 Drawing Sheets

SPRAYING TOOLING OF MOTOR VEHICLE WHEEL HUB

CROSS-REFERENCE TO RELATED APPLICATION

The present application claims priority to Chinese Patent Application No. 201910531331.0, filed on Jun. 19, 2019, the contents of which are hereby incorporated by reference in their entirety.

BACKGROUND

Motor vehicle wheel hubs are used for mounting motor vehicle tires, and are also connected to axles and used for mounting braking components. The motor vehicle wheel hubs are one of important parts and components of motor vehicles, and have requirements on mechanical properties such as strength and also have requirements on aesthetic performance. However, the motor vehicle wheel hubs are exposed to external environments in long term and are prone to loss of good mechanical properties or aesthetic performance due to corrosion; in order to improve the corrosion resistance and aesthetic performance of the motor vehicle wheel hubs, the motor vehicle wheel hubs are required to be subjected to surface protection treatment, such as protective paint spraying, during the processing production of the motor vehicle wheel hubs.

At present, the protective paint spraying of the motor vehicle wheel hubs is generally performed on a production line of assembly-line operation, the wheel hubs are fixed by using a tooling, and then, the wheel hubs pass through a spray nozzle sequentially, so as to perform spraying operation on the motor vehicle wheel hubs. However, the spraying of all positions of surfaces of the motor vehicle wheel hubs is easy to be not uniform enough due to non-uniform spraying of the spray nozzle, and thus, the difficulty of work of subsequent fine finishing is increased.

SUMMARY

The present disclosure relates to motor vehicle manufacturing technologies and particularly to spraying tooling of a motor vehicle wheel hub.

In view of above, embodiments of the present disclosure are expected to provide spraying tooling of a motor vehicle wheel hub. The spraying tooling can be used for uniformly spraying the surface of the motor vehicle wheel hub in a spraying process.

In order to achieve the object described above, a technical solution of the embodiments of the present disclosure is as follows:

The present disclosure provides a spraying tooling of a motor vehicle wheel hub. The tooling includes an assembly line, multiple wheel hub bases each capable of moving on the assembly line, multiple driving mechanisms each capable of driving a wheel hub base to rotate at a preset position on the assembly line, multiple triggering components each capable of triggering the driving mechanism to operate, multiple maintaining components each capable of maintaining a preset time for a triggering component, and a control component; the wheel hub base includes a sliding seat capable of moving on the assembly line and a tray capable of rotating along with rotation of the driving mechanism, and the tray is rotatably mounted on the sliding seat; and all of the driving mechanisms and the triggering components are electrically connected to the control component.

In an implementation, a bottom of the tray may include a rotating shaft, an end of the rotating shaft is fixed to a bottom of the tray, another end of the rotating shaft is rotatably mounted on the sliding seat, and the sliding seat includes a rolling bearing matched with the rotating shaft; and the tray is rotatably mounted on the sliding seat through the rotating shaft.

In an implementation, the assembly line may include a guide rail, a conveying belt and a first motor, the guide rail is fixed to the ground, and the conveying belt moves relative to the guide rail under the driving of the first motor; and the sliding seat moves on the surface of the guide rail under the driving of the conveying belt.

In an implementation, each driving mechanism may include a second motor fixed to a side of the guide rail and a first gear mounted to an output shaft of the second motor, a second gear matched with the first gear is arranged on the rotating shaft in a sleeve manner, and the second gear is fixed to the rotating shaft; and the second motor operates when the triggering components is triggered.

In an implementation, the triggering component may be a proximity switch, and the proximity switch is fixed to one side of the guide rail; and an induction sheet matched with the proximity switch is arranged on the rotating shaft in a sleeve manner, the induction sheet moves in an induction range of the proximity switch when the wheel hub base moves to the preset position on the assembly line, and the triggering component is triggered.

In an implementation, each of the maintaining components may be a torsion spring, an end of the torsion spring is connected with the rotating shaft, and another end of the torsion spring is connected with the induction sheet; the torsion spring is provided with free stroke of a preset angle, when rotating angle of the rotating shaft is smaller than the free stroke of the torsion spring, the induction sheet is invariable in position, and the triggering component is maintained in a triggered state; otherwise, the induction sheet is variable in position, and the triggered state of the triggering component is released.

In an implementation, at least two axisymmetric supporting arms, which support the motor vehicle wheel hub, may be arranged below the tray, and each supporting arm includes a supporting end capable of supporting an inner wall of the motor vehicle wheel hub and a connecting end connected with the rotating shaft; and the supporting end is mounted at bottom of the tray in a slidable or rotatable manner and can abut against the inner wall of the motor vehicle wheel hub during the rotation of the rotating shaft.

In an implementation, a threaded sleeve may be mounted around the rotating shaft, the threaded sleeve is provided with internal threads are formed in the threaded sleeves, and the rotating shaft is provided with external threads matched with the internal threads; and the connecting end of the supporting arm is connected to the threaded sleeve, the threaded sleeve moves downwards or upwards on the rotating shaft during the rotation of the rotating shaft and drives the supporting end of the supporting arm to abut against the inner wall of the motor vehicle wheel hub.

In an implementation, each supporting arm may include a first section with the supporting end and a second section with the connecting end, and a non-supporting end of the first section is connected with a non-supporting end of the second section; a joint of the first section and the second section is hinged to the bottom of the tray, the second section is telescopic in length, and the connecting end is connected to the threaded sleeve; and the threaded sleeve moves downwards on the rotating shaft and drives each supporting end to rotate upwards in a manner of taking the joint of the first section and the second section as a rotating axis and abuts against the inner wall of the corresponding motor vehicle wheel hub when the rotating shaft rotates.

In an implementation, a slide ring capable of rotating along a circumferential direction of the threaded sleeve may be mounted around the outside of the threaded sleeve, and the connecting end of the supporting arm is hinged to an excircle wall of the slide ring.

The spraying tooling of the motor vehicle wheel hub, provided by the embodiments of the present disclosure, includes an assembly line, multiple wheel hub bases each capable of moving on the assembly line, multiple driving mechanisms each capable of driving a wheel hub base to rotate at a preset position of the assembly line, multiple triggering components each capable of triggering a driving mechanism to operate, multiple maintaining components each capable of maintaining a preset time for a triggering component and a control component; the wheel hub base includes a sliding seat capable of moving on the assembly line and a tray capable of rotating along with rotation of the driving mechanism, and the tray is rotatably mounted on the sliding seat; all of the driving mechanisms and the triggering components are electrically connected to the control component; obviously, according to the spraying tooling of the motor vehicle wheel hub, provided by the embodiments of the present disclosure, the motor vehicle wheel hub is rotated during spraying, and thus, the spraying of protective paint of the motor vehicle wheel hub is more uniform; and the tooling is simple in structure and convenient in implementation.

Other beneficial effects of the embodiments of the present disclosure will be further described in specific embodiments with reference to specific technical solutions.

BRIEF DESCRIPTION OF THE DRAWINGS

In order to more clearly describe technical solutions of embodiments of the present disclosure, drawings required to be used in descriptions to the embodiments will be described briefly below. It should be understood that the drawings described below are only a part of drawings of the embodiments of the present disclosure, and other drawings can be obtained by an ordinary person skilled in the art according to these drawings on the premise of not making inventive work.

DETAILED DESCRIPTION OF THE EMBODIMENTS

Figure 1:
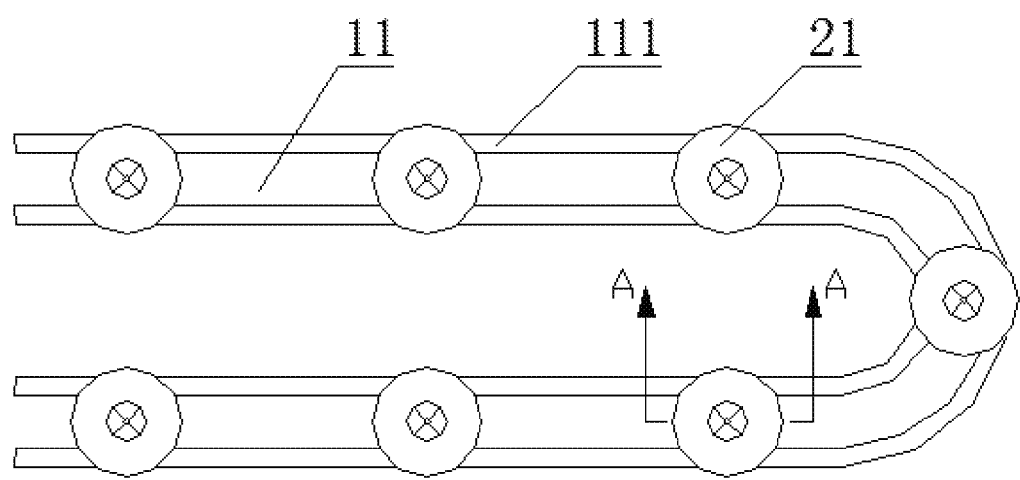
FIG. 1 is a schematic diagram of spraying tooling of a motor vehicle wheel hub of embodiments of the present disclosure.
Figure 2:
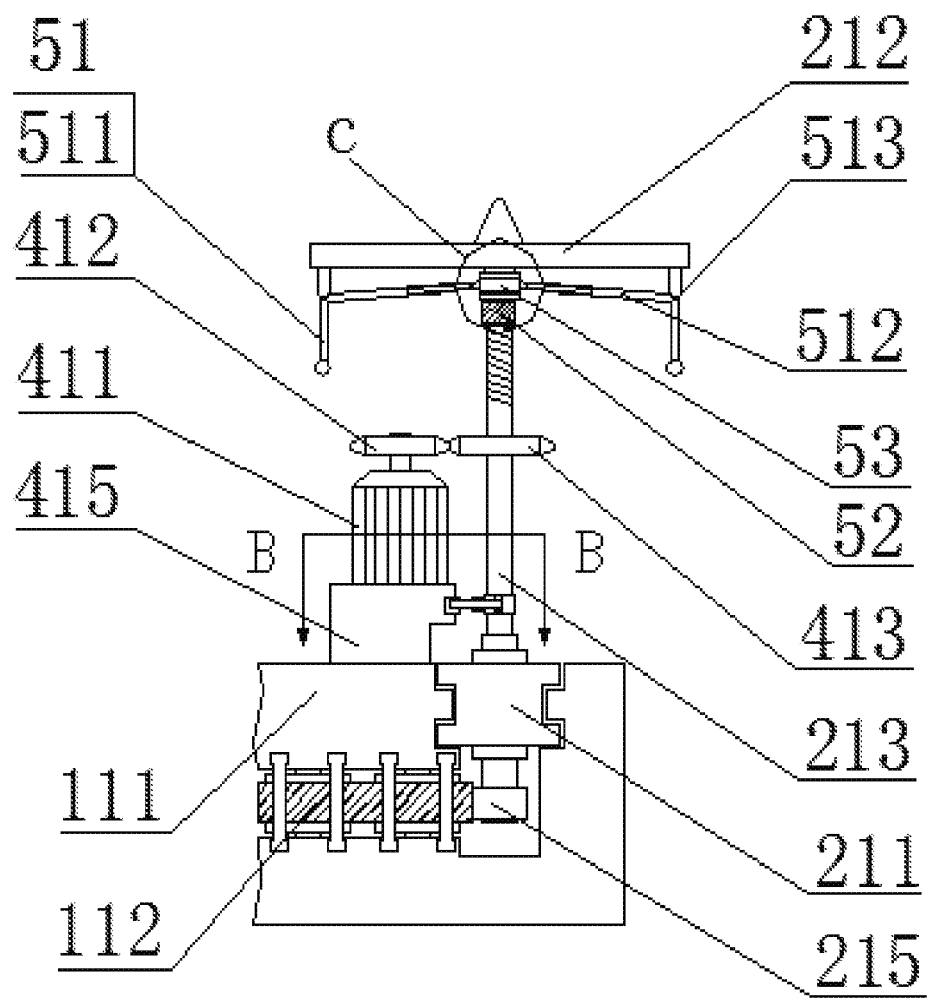
FIG. 2 is a sectional schematic diagram along A-A direction in FIG. 1.
Figure 3:
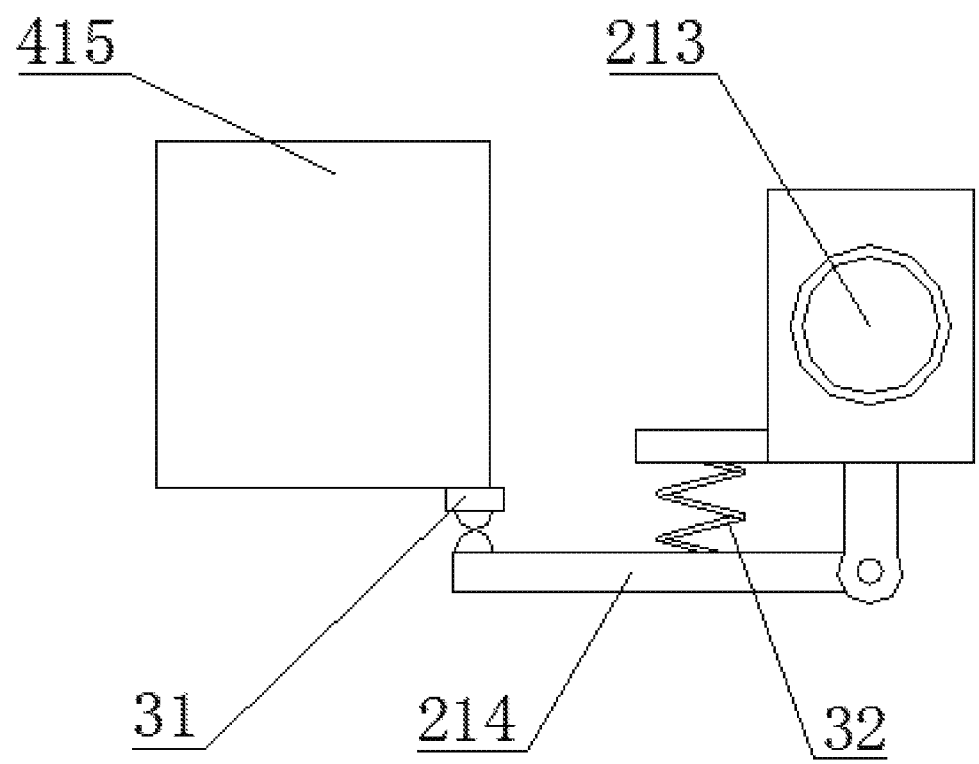
FIG. 3 is a local schematic diagram along B-B direction in FIG. 2.

It should be noted that in contents of embodiments of the present disclosure, unless otherwise noted and defined, a term "connection" should be generally comprehended, for example the term may be electric connection, communication inside of two elements, direct connection or indirect connection through an intermediate medium; for the ordinary person skilled in the art, specific meanings of the above-mentioned term can be comprehended according to specific conditions. In the embodiments of the present disclosure, term "first", "second" or "third" if involved is only used to distinguish similar objects and do not represent specific sequencing of the objects, and it is understood that the term "first", "second" or "third" can be subjected to mutual exchange of a specific sequence or successive sequence under permissible conditions.

The embodiments of the present disclosure provide spraying tooling of a motor vehicle wheel hub. The spraying tooling of the motor vehicle wheel hub includes an assembly line, multiple wheel hub bases each capable of moving on the assembly line, multiple driving mechanisms each capable of driving a wheel hub base to rotate at a preset position on the assembly line, multiple triggering components each capable of triggering a driving mechanism to operate, multiple maintaining components each capable of maintaining a preset time for a triggering component, and a control component; the wheel hub bases includes a sliding seat capable of moving on the assembly line and a tray capable of rotating along with rotation of the driving mechanism, and the tray is rotatably mounted on the sliding seat; and all of the driving mechanisms and the triggering components are electrically connected to the control component.

According to the spraying tooling of the motor vehicle wheel hub, provided by the embodiments of the present disclosure, the motor vehicle wheel hub is rotated during spraying, and thus, the spraying of protective paint of the motor vehicle wheel hub is more uniform; and the tooling is simple in structure and convenient in implementation.

In an embodiment, the bottom of the tray includes a rotating shaft, an end of the rotating shaft is fixed to a bottom of the tray, another end of the rotating shaft is rotatably mounted to the sliding seat, and the sliding seat includes a rolling bearing matched with the rotating shaft; and the tray is rotatably mounted the sliding seat through the rotating shaft. Through the rotating shafts and the rolling bearings, the present embodiment is a preferred embodiment and is simpler in structure and lower in cost. Specifically, the rolling bearings are mounted in bearing chambers, and the sliding seats are provided with the bearing chambers.

In an embodiment, the assembly line includes a guide rail, a conveying belt and a first motor, the guide rail is fixed to the ground, and the conveying belt moves relative to the guide rail under the driving of the first motor; and the sliding seat moves on a surface of the guide rail under the driving of the conveying belt. The guide rail is relatively good in stability, the sliding seat moves on the surface of the guide rail, and compared with assembly lines of other forms, this mode has the advantages that the sliding seats are more stable in position, and the quality of spraying of the motor vehicle wheel hub can be guaranteed. The conveying belt may be an ordinary rubber belt, and the sliding seats are provided with belt pulleys; and the conveying belt may also be a synchronous belt, and the sliding seats are provided with synchronous pulleys.

In an embodiment, each driving mechanism includes a second motor fixed to a side of the guide rail and a first gear mounted to an output shaft of the second motor, a second gear matched with the first gear is arranged on the rotating shaft in a sleeve manner, and the second gear is fixed to the rotating shaft; and the second motor operates when a corresponding triggering component is triggered. The rotating shaft is driven to rotate through the second motor and the gear, and thus, the present embodiment is a preferred embodiment and is simpler.

In an embodiment, each of the triggering components is a proximity switch, and the proximity switch is fixed to one side of the guide rail; and an induction sheet matched with the proximity switch is arranged on the rotating shaft in a sleeve manner, the induction sheet moves in an induction range of the proximity switch when a corresponding wheel hub base moves to the preset position on the assembly line, and the triggering component is triggered. The proximity switches can be triggered without direct contact, which are more reliable and are not prone to damage.

In an embodiment, each of the maintaining components is a torsion spring, an end of the torsion spring is connected with the rotating shaft, and another end of the torsion spring is connected with the induction sheet; the torsion spring is provided with free stroke of a preset angle, when rotating angle of the rotating shaft is smaller than the free stroke of the torsion spring, the induction sheet is invariable in position, and the triggering component is maintained in a triggered state; otherwise, the induction sheet is variable in position, and the triggered state of the triggering components is released. Herein, the free stroke of each torsion spring means that the another end of each torsion spring cannot rotate together when one end of the corresponding torsion spring rotates; the magnitude of the free stroke of each torsion spring determines duration of maintaining of a triggered state of the triggering components; and it can be understood that the torsion springs herein may also be springs of other types, for example tension springs, in this situation, the connected parts need corresponding adjustment. Moreover, the maintaining components are designed as the torsion springs, so as to make the control process simpler, and have a low cost; and it can be understood that the maintaining components may be electrical elements such as time relays.

In an embodiment, at least two axisymmetric supporting arms, which support the motor vehicle wheel hub, are arranged below the tray, and each supporting arm includes a supporting end capable of supporting an inner wall of the motor vehicle wheel hub and a connecting end connected with the rotating shaft; and the supporting end is mounted at the bottom of the tray in a slidable or rotatable manner and can abut against the inner wall of the motor vehicle wheel hub during the rotation of the rotating shaft. In this way, the motor vehicle wheel hub is more stable during spraying, the effect of spraying is better, and thus, the present embodiment is a preferred embodiment.

In an embodiment, a threaded sleeve is mounted around the rotating shaft, the threaded sleeve is provided with internal threads, and the rotating shaft is provided with external threads matched with the internal threads; and the connecting end of the supporting arm is connected to the threaded sleeve, the threaded sleeve moves downwards or upwards on the rotating shaft during the rotation of the rotating shaft and drives the supporting end of the supporting arm to abut against the inner wall of the motor vehicle wheel hub. During the rotation of the rotating shafts, the threaded sleeves will move downwards or upwards along axial directions of the rotating shafts similar to a screw nut of a screw nut-screw rod and then drive the supporting ends of the supporting arms to move, the supporting ends are driven to rotate upwards if the threaded sleeves move downwards, and the supporting ends are directly driven to move upwards if the threaded sleeves move upwards. Axial movement of the threaded sleeves is achieved through threaded connection and thus is simpler, and the present embodiment is a preferred embodiment.

In an embodiment, each supporting arm includes a first section with a supporting end and a second section with a connecting end, and the non-supporting end of the first section is connected with a non-supporting end of the second section; a joint between the first section and the second section is hinged to the bottom of the tray, the second section is telescopic in length, and the connecting end is connected to the threaded sleeve; and the threaded sleeve moves downwards on the rotating shaft and drives each supporting end to rotate upwards in a manner of taking the joint between the first section and the second section as a rotating axis and abuts against the inner wall of the motor vehicle wheel hub when the rotating shaft rotates. Each supporting end is driven to rotate upwards through downward movement of the corresponding threaded sleeve, the structure is simpler, the implementation is convenient, and thus, the present embodiment is a preferred embodiment. A distance between the corresponding threaded sleeve and the joint of the first section and the second section is increased when the corresponding threaded sleeve moves downwards, and thus, the length of each second section is designed to be telescopic, and particularly, the second sections may be telescopic links.

In an embodiment, a slide ring capable of rotating along a circumferential direction of the threaded sleeve is mounted around the outside of each of the threaded sleeves, and the connecting end of each of the supporting arms is hinged to an excircle wall of each of the slide rings. During the spraying of the wheel hubs, the wheel hubs are rotating, while the threaded sleeves are not rotating, with the design of the rotatable slide rings, influence on stability of the motor vehicle wheel hubs caused by relative rotation between the supporting ends of the supporting arms and the corresponding motor vehicle wheel hubs can be reduced, and thus, the present embodiment is a preferred embodiment. Of course, if contact surface of each of the supporting ends and the inner wall of each of the motor vehicle wheel hubs are relatively smooth, the slide rings may not be arranged.

The present disclosure is further described in details below with reference to drawings and specific embodiments. It should be understood that the specific embodiments described herein are only intended to explain the present disclosure, rather than define the present disclosure; and moreover, the embodiments described below are only part of embodiments of the present disclosure, rather than all embodiments, and all other embodiments achieved by the ordinary person skilled in the art on the premise of not making inventive work according to these embodiments all fall within the scope of protection of the present disclosure.

The embodiments provide spraying tooling of a motor vehicle wheel hub; and it can be understood that structures and principles of the spraying tooling of the motor vehicle wheel hub, provided by the embodiments, are also applicable to other motor vehicle wheel hubs.

Referring to FIGS. 1 to 4, embodiments of the present disclosure provide spraying tooling of a motor vehicle wheel hub. The tooling includes an assembly line 11, multiple wheel hub bases 21 each capable of moving on the assembly line 11, multiple driving mechanisms capable each of driving a wheel hub base 21 to rotate at a preset position on the assembly line 11, multiple triggering components 31 each capable of triggering a driving mechanism to operate, multiple maintaining components 32 each capable of maintaining a preset time for a triggering component 31, and a control component (not shown in drawings); the wheel hub base 21 includes a sliding seat 211 capable of moving on the assembly line 11 and a tray 212 capable of rotating along with rotation of the driving mechanism, and the tray 212 is rotatably mounted on the sliding seat 211; and all of the driving mechanisms and the triggering components 31 are electrically connected to the control component. The control component is used for controlling the operation of the driving mechanism according to triggering condition of the triggering component 31, of course, the control component can also be used for controlling operation of the assembly line, and the assembly line is general-purpose technology and is not explained any more.

In an embodiment, the bottom of the tray 212 includes a rotating shaft 213, an end of the rotating shaft 213 is fixed to a bottom of the tray 212, another end of the rotating shaft 213 is rotatably mounted to the sliding seat 211, and the sliding seat 211 includes a rolling bearing (not shown in drawings) matched with the rotating shaft 213; and the tray 212 is rotatably mounted to the sliding seat 211 through the rotating shaft 213.

In an embodiment, the assembly line 11 includes a guide rail 111, a conveying belt 112 and a first motor (not shown in drawings), the guide rail 111 is fixed to the ground, and the conveying belt 112 moves relative to the guide rail 111 under the driving of the first motor; and the sliding seat 211 moves on the surface of the guide rail 111 under the driving of the conveying belt 112. Specifically, the guide rail 111 can be indirectly fixed to the ground, for example, the guide rail 111 is fixed to the ground through a rack of the assembly line; and the conveying belt 112 is a synchronous belt, and the sliding seat 211 is provided with a synchronous pulley 215.

In an embodiment, each driving mechanism includes a second motor 411 fixed to a side of the guide rail 111 and a first gear 412 mounted to an output shaft of the second motor 411, a second gear 413 matched with the first gear 412 is arranged on the rotating shaft 213 in a sleeve manner, and the second gear 413 is fixed to the rotating shaft 213; and the second motor 411 operates when the triggering component 31 is triggered. Specifically, the second motors 411 can be fixed to a motor base 415 of the assembly line.

In an embodiment, each of the triggering components 31 is a proximity switch, and each proximity switch is fixed to a side of the corresponding motor base 415; and an induction sheet 214 matched with the proximity switch is arranged on the rotating shaft 213 in a sleeve manner, the induction sheet 214 moves in an induction range of the proximity switch when the wheel hub base 21 moves to the preset position of the assembly line 11, and the triggering component 31 is triggered.

In an embodiment, each of the maintaining components 32 is a torsion springs, an end of the torsion spring is connected with the rotating shaft 213, and another end of the torsion spring is connected with the induction sheet 214; the torsion spring is provided with free stroke of a preset angle, when rotating angle of the rotating shaft 213 is smaller than the free stroke of the torsion spring, the induction sheet 214 is invariable in position, and the triggering component 31 is maintained in a triggered state; otherwise, the induction sheet 214 is variable in position, and the triggered state of the triggering component 31 is released. Specifically, the torsion springs are of special design, and each of the induction sheets 214 can be driven to move and be divorced from the induction range of the proximity switch only after the rotating shaft rotates by a circle.

Figure 4:
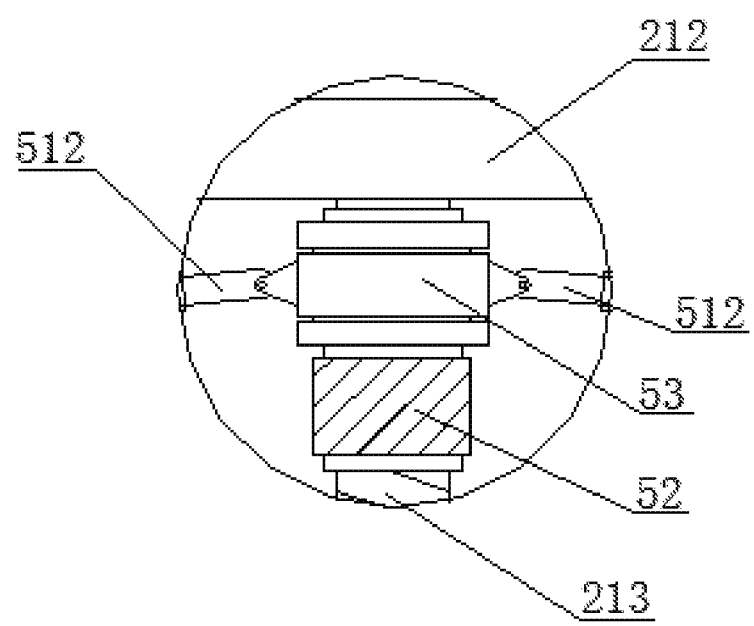
FIG. 4 is a local enlarged schematic diagram at location C in FIG. 3.

In an embodiment, four supporting arms 51, which are uniformly distributed along the circumferential direction and support the motor vehicle wheel hub, are arranged below each tray 212, and each supporting arm 51 includes a supporting end capable of supporting an inner wall of a corresponding motor vehicle wheel hub and a connecting end connected with the corresponding rotating shaft 213; Specifically, each supporting arm 51 is divided into a first section 511 and a second section 512, herein the first section 511 includes the supporting end, the second section 512 includes the connecting end, and non-supporting end of the first section 511 is connected with an non-supporting end of the second section 512; joint of the first section 511 and the second section 512 is hinged to bottoms of the trays, and the second section 512 is telescopic in length; and the first section 511 and the second section 512 are substantially intersects vertically, so that a stretching space of an entire supporting arm 51 can be saved, and the structure is more compact.

a threaded sleeve 52 is mounted around each rotating shaft 213, the threaded sleeve 52 is provided with internal threads, and the rotating shaft 213 is provided with external threads matched with the internal threads; a slide ring 53 capable of rotating along a circumferential direction of the threaded sleeve 52 is mounted around the outside of the threaded sleeve 52 and is fixed to axial position of the threaded sleeve 52; the connecting end of each the supporting arm 51 is hinged to an excircle wall of the slide ring 53; the threaded sleeve 52 moves downwards on the rotating shaft 213 to drive the slide ring 53 to move downwards when the rotating shaft 213 rotates, and the slide ring 53 drives the supporting end to rotate upwards in a manner of taking the joint of the first section 511 and the second section 512, i.e., a hinged position 513 of the bottom of the corresponding tray as a rotating axis and abuts against the inner wall of the motor vehicle wheel hub. It should be noted that a part of the threaded sleeve 52 in FIG. 4 is exposed out of the slide ring 53, the other parts of the threaded sleeve 52 are covered by the slide ring 53, and the threaded sleeve is not all exposed out of the slide rings.

In order to better comprehend the spraying tooling of the motor vehicle wheel hub, a using method of the spraying tooling of the motor vehicle wheel hub is presented below, including the following steps:

In S501: a motor vehicle wheel hubs is placed on a corresponding tray of the wheel hub base 21 in a manner that cavity faces downwards;

In S502: the first motor of the assembly line 11 is started, and the wheel hub bases 21 are driven to move on the assembly line through the conveying belt 112;

In S503: when the wheel hub base 21 moves to a spraying position, the induction sheet 214 on the rotating shaft 213 enters the induction range of the proximity switch, and the proximity switch is triggered; and a trigger signal is received by the control component, the first motor is commanded to stop, the conveying belt 112 stops moving, the second motor 411 is commanded to be started, the rotating shaft is driven to rotate through engagement between the first gear 412 and the second gear 413, and meanwhile, a spray nozzle of the spraying service position starts spraying operation;

In S504: after each rotating shaft rotates by a circle, the free stroke of the torsion spring ends up, the induction sheet 214 is driven to move and be divorced from the induction range of the proximity switch, the triggered state of the trigger switch is released, a release signal is received by the control component, the second motor 411 is commanded to stop rotation, meanwhile, the spray nozzle of the spraying position also stops the spraying operation, and the spraying operation is completed; and In S505: the first motor is started, and the conveying belt 112 restarts to move.

S503-S505 are repeated until the spraying operation of the motor vehicle wheel hubs of this batch is completed.

The above are only preferred embodiments of the present disclosure and not intended to limit the protection scope of the present disclosure, and all modifications, equivalent replacements, improvements and the like made within the spirit and principle of the present disclosure shall fall within the scope of protection of the present disclosure.

The invention claimed is:

1. Spraying tooling of a motor vehicle wheel hub, the spraying tooling comprising an assembly line, a plurality of wheel hub bases each capable of moving on the assembly line, a plurality of driving mechanisms each capable of driving one of the plurality of wheel hub bases to rotate at a preset position on the assembly line, a plurality of triggering components each capable of triggering one of the plurality of driving mechanisms to operate, a plurality of maintaining components each capable of maintaining a preset time for one of the plurality of triggering components, and a controller; wherein each of the plurality of wheel hub bases comprises a sliding seat capable of moving on the assembly line and a tray capable of rotating along with rotation of a respective one of the plurality of driving mechanisms, and the tray is rotatably mounted on the sliding seat; and each of the plurality of driving mechanisms and each of the plurality of triggering components are electrically connected to the controller, wherein a bottom of the tray comprises a rotating shaft, an end of the rotating shaft is fixed to the bottom of the tray, another end of the rotating shaft is rotatably mounted to the sliding seat, and the sliding seat comprises a rolling bearing matched with the rotating shaft; and the tray is rotatably mounted to the sliding seat through the rotating shaft;

the assembly line comprises a guide rail, a conveying belt and a first motor, the guide rail is fixed to ground, and the conveying belt moves relative to the guide rail under driving of the first motor; and the sliding seat moves on a surface of the guide rail under driving of the conveying belt;

each of the plurality of driving mechanisms comprises a second motor fixed to a side of the guide rail and a first gear mounted to an output shaft of the second motor, a second gear matched with the first gear is arranged on the rotating shaft in a sleeve manner, and the second gear is fixed to the rotating shaft; and the second motor operates when a respective one of the plurality of triggering components is triggered; and each of the plurality of triggering components is a proximity switch, and the proximity switch is fixed to the side of the guide rail; and an induction sheet matched with the proximity switch is arranged on the rotating shaft in a sleeve manner, the induction sheet moves in an induction range of the proximity switch when a respective one of the plurality of wheel hub bases moves to the preset position on the assembly line, and the respective one of the plurality of triggering components is triggered.

2. The spraying tooling of the motor vehicle wheel hub according to claim 1, wherein each of the plurality of maintaining components is a torsion spring, an end of the torsion spring is connected with the rotating shaft, and another end of the torsion spring is connected with the induction sheet; the torsion spring is provided with free stroke of a preset angle, when a rotating angle of the rotating shaft is smaller than the free stroke of the torsion spring, the induction sheet is invariable in position, and the respective one of the plurality of triggering components is maintained in a triggered state; otherwise, the induction sheet is variable in position, and the triggered state of the respective one of the plurality of triggering components is released.

3. The spraying tooling of the motor vehicle wheel hub according to claim 2, wherein at least two axisymmetric supporting arms, which support the motor vehicle wheel hub, are arranged below the tray, and each of the at least two axisymmetric supporting arms comprises a supporting end capable of supporting an inner wall of the motor vehicle wheel hub and a connecting end connected with the rotating shaft; and the supporting end is mounted at the bottom of the tray in a slidable or rotatable manner and can abut against the inner wall of the motor vehicle wheel hub during rotation of the rotating shaft.

4. The spraying tooling of the motor vehicle wheel hub according to claim 3, wherein a threaded sleeve is mounted around the rotating shaft, the threaded sleeve is provided with internal threads formed in the threaded sleeve, and the rotating shaft is provided with external threads matched with the internal threads; and the connecting end is connected to the threaded sleeve, the threaded sleeve moves downwards or upwards on the rotating shaft during the rotation of the rotating shaft and drives the supporting end to abut against the inner wall of the motor vehicle wheel hub.

5. The spraying tooling of the motor vehicle wheel hub according to claim 4, wherein each of the at least two axisymmetric supporting arms comprises a first section with the supporting end and a second section with the connecting end, and a non-supporting end of the first section is connected with a non-supporting end of the second section; a joint of the first section and the second section is hinged to the bottom of the tray, the second section is telescopic in length, and the connecting end is connected to the threaded sleeve; and the threaded sleeve moves downwards on the rotating shaft and drives each of the supporting ends to rotate upwards in a manner of taking the joint of the first section and the second section as a rotating axis and abuts against the inner wall of the motor vehicle wheel hub when the rotating shaft rotates.

6. The spraying tooling of the motor vehicle wheel hub according to claim 5, wherein a slide ring capable of rotating along a circumferential direction of the threaded sleeve is mounted around an outside of the threaded sleeve, and the connecting end is hinged to an excircle wall of the slide ring.

* * * * *